US011934151B2

(12) United States Patent
Hebbo

(10) Patent No.: US 11,934,151 B2
(45) Date of Patent: Mar. 19, 2024

(54) UNIVERSAL WORLD TIMEPIECE

(71) Applicant: Hussam Hebbo, Berlin (DE)

(72) Inventor: Hussam Hebbo, Berlin (DE)

(*) Notice: Subject to any disclaimer, the term of this patent is extended or adjusted under 35 U.S.C. 154(b) by 1111 days.

(21) Appl. No.: 16/498,918

(22) PCT Filed: Apr. 4, 2017

(86) PCT No.: PCT/DE2017/100264
§ 371 (c)(1),
(2) Date: Sep. 27, 2019

(87) PCT Pub. No.: WO2018/184606
PCT Pub. Date: Oct. 11, 2018

(65) Prior Publication Data

US 2020/0050151 A1 Feb. 13, 2020

(51) Int. Cl.
*G04B 19/16* (2006.01)
*G04B 19/22* (2006.01)
*G04G 9/00* (2006.01)

(52) U.S. Cl.
CPC ......... *G04B 19/166* (2013.01); *G04B 19/223* (2013.01); *G04G 9/0076* (2013.01)

(58) Field of Classification Search
CPC .. G04B 19/166; G04B 19/223; G04B 19/225; G04G 9/0076
See application file for complete search history.

(56) References Cited

U.S. PATENT DOCUMENTS 745,680 A * 12/1903 Schumacher .......... G04B 19/22 368/27
2,919,536 A * 1/1960 Francoi ................ G04B 19/223 968/167
4,717,260 A * 1/1988 Tsuji .................... G04B 19/223 368/21

(Continued)

OTHER PUBLICATIONS

International Search Report—PCT/DE2017/100264.
International Search Report—English Translation.

*Primary Examiner* — Edwin A. Leon
*Assistant Examiner* — Sean R Brannon
(74) *Attorney, Agent, or Firm* — Ralph E. Jocke; WALKER & JOCKE

(57) ABSTRACT

Exemplary arrangements relate to a universal world timepiece such as a clock having a movement (11) in connection with indicators such as hands (16, 18, 20). The timepiece includes a stationary oriented 24-hour clock face (101, 301, 401, 501) including hour marks for each hour, and a dial (103, 303, 403, 503) which is movable relative to the 24-hour clock face. The example dial has a unique icon such as a different Latin letter for each hour of the 24 hours. A computer (10) of the timepiece may operate to determine geographic coordinates and/or or to receive wireless time signals and to determine the time zone in which the timepiece is currently located. The computer operates to cause the dial to be rotatably positioned responsive to the time zone determination, to cause a particular icon to be linearly aligned with a particular hour mark of the clock face. The arrangement enables a time in a designated time zone such as world time to be read, along with the local time and enables users in various time zones with clocks including such dials to set a future appointment at the same real time through designation of an icon.

25 Claims, 5 Drawing Sheets

(56) References Cited

U.S. PATENT DOCUMENTS

| | | | | | |
|---|---|---|---|---|---|
| 5,237,544 | A * | 8/1993 | Sase | G04G 9/0076 | 368/21 |
| 5,724,316 | A * | 3/1998 | Brunts | G08G 1/096872 | 368/21 |
| 6,243,324 | B1 * | 6/2001 | Teng | G04B 19/223 | 368/21 |
| 8,699,303 | B2 * | 4/2014 | Caruso | G04B 19/223 | 368/76 |
| 9,785,120 | B2 * | 10/2017 | Westra | G04B 19/22 | |
| 2005/0105397 | A1 * | 5/2005 | Tuason | G04B 19/262 | 368/21 |
| 2007/0183266 | A1 * | 8/2007 | Han | G04G 9/0076 | 368/21 |
| 2011/0151415 | A1 * | 6/2011 | Darling | G09B 29/005 | 434/149 |
| 2012/0075960 | A1 * | 3/2012 | Sun | G04B 19/223 | 368/21 |
| 2014/0247700 | A1 | 9/2014 | Honda | | |

* cited by examiner

UNIVERSAL WORLD TIMEPIECE

TECHNICAL FIELD

Exemplary arrangements relate to a universal world time-clock, comprising a movement with hands, a stationary 24-hour clock face, a clock face rotatable with respect to the 24-hour clock face with a symbol for each time zone (time zone dial) and a corresponding digital clock.

BACKGROUND

The need for a universal world time clock for international trade, for the arrangement of international telephone conferences or for the arrangement of appointments of two corresponding partners across time-zone borders has existed for a long time. To simplify the appointment, a clock with a classic dial with a circular dial, a 12-hour division and an hour and minute hands (analog clock) sometimes have smaller clocks in their dials, indicating a presettable time elsewhere in the world. Furthermore, in companies that frequently correspond with partners in other time zones, different clocks are kept for major capitals of the world. It is also known to arrange international dating after World Time, the so-called UTC, "Universal Time Coordinated".

Often, when agreeing to a time across time zones, the terms of the time zone and the zone time are confused with each other. In this disclosure, a time zone describes an area oriented approximately on the geographical longitude on the earth, whereas the zone time designates the local time agreed to be applicable in the respective time zone.

Local time, world time, plus summer (e.g. daylight savings) time introduced in different countries at different times of the year, and again at other times of the year, are causing great confusion when it comes to scheduling deadlines across time zones. Even very experienced people, such as airline pilots or frequent travelers, are often mistaken in the actual time. A particular problem is coded appointment files that are exchanged for agreeing on times for telephone conferences with computers. Despite the availability of a universally recognized world time, the UTC, calendar dates are still being agreed in the local time of geographic locations such as San Francisco. Corresponding computers convert the time from San Francisco into a local time.

To arrange international appointments, there is a need to use an intuitive time schedule. The specification of two times with identical structure, namely a local time and a world time, may distort the understanding of the actually intended time between two corresponding partners. This intuitive time calculation of a new exemplary arrangement disclosed herein requires no change in the timing of mathematics, but the international agreement or recognized designation on how to name the world time, so that the world time is clearly, unmistakably and clearly recognizable as such. It should already be apparent from the syntax of the time specification, which time it is that use two mutually corresponding partners in the agreement of an appointment.

Some approaches are already disclosed in the Swiss patent CH 267439. This patent discloses a watch which, in addition to the known 12-hour dial, has a mask with a 30° twisted window, each window being associated with a digit of the twelve hours of a clock.

Below the twelve windows, a clockwork operates a 12-hourly rhythm dial divided into 24 sections, on which the numbers 1 to 12 and 13 to 24 are shown. This watch displays the time in 24-hour format with a 12-hour dial.

Essential to the clock according to the Swiss patent CH 267439 is that the 24 hours is assigned a letter of the Latin alphabet. Starting from a time zone corresponding to the world time UTC+2, Central European Time, a user of the clock adjusts the time 0 o'clock to correspond to a letter assigned to the time zone, there "L". If the user of the clock moves to a different time zone, the user twists the hands according to the local zone time, but takes the disk with the letters for each time zone.

The ratio of the local time on the stationary dial changes with respect to the movable dial. However, the absolute time, in the sense of a world time that is the same for all time zones, is retained. The example chosen in the Swiss patent CH 267439 assumed that the time M-clock corresponds to the world time noon and Z clock corresponds to the world time midnight. A disadvantage of the clock disclosed there is that the clock must be adapted to the local time. Furthermore, in the Swiss patent CH 267439 it is taught to name the 24 hours of the day with the letters of the Latin alphabet except "L" ("local") and "W" ("world"), so that in the designation of the time already has a first difficulty. Furthermore, as the last hour of the day, the symbol "Z" is used, which is misleading, because times with a "Z" usually indicate the so-called "Z", "Zulu" time, the world time in the time zone "Z" of NATO.

SUMMARY OF DISCLOSURE

An object of an exemplary arrangement is to provide a universal world time clock that provides a convenient and intuitive time display of world time.

The object of the exemplary arrangement is achieved by the fact that in or on the world clock a device for determining geographic coordinates is connected to a device for automated rotation of the 24-hour dial, and the device for automated rotation, the 24-hour dial when changing the geographic coordinates is rotatably positioned corresponding to the time zone. Further advantageous arrangements are disclosed.

According to exemplary arrangements, it is therefore provided to automatically reset a world time indication on a clock by means of a device for determining the geographic coordinates. In this case, the device for determining the geo-coordinates is connected to a table which contains the geographical boundaries of the time zones. If the device for determining the geo-coordinates has determined a coordinate, it is determined via known algorithms for determining whether the two-dimensional point lies within a predetermined area in which time zone the world time clock is located. Accordingly, the 24-hour dial is adjusted so that the ratio of 0 o'clock on the stationary dial corresponding to the local time is set to the world time corresponding to the time zone in which the clock is located.

In order for world time to be intuitively recognizable as such, and even the naming of the world time clearly indicates what time is meant, it is preferred that the movably positioned 24-hour dial each have unique icons comprising one letter of the Latin alphabet for each hour of the 24-hour indicators, preferably the hours 01:00 of the current day to 0:00 of the next day have the continuous and gapless letter series from A to X in alphabetical order. It is therefore intended that the times in the 24-hour format of the time zone "Z" (Zulu) of the UTC time have the following designations:

| 01:00 | 02:00 | 03:00 | 04:00 | 05:00 | 06:00 | 07:00 | 08:00 | 09:00 | 10:00 | 11:00 | 12:00 |
|---|---|---|---|---|---|---|---|---|---|---|---|
| A | B | C | D | E | F | G | H | I | J | K | L |

and

| 13:00 | 14:00 | 15:00 | 16:00 | 17:00 | 18:00 | 19:00 | 20:00 | 21:00 | 22:00 | 23:00 | 00:00 |
|---|---|---|---|---|---|---|---|---|---|---|---|
| M | N | 0 | P | Q | R | S | T | U | V | W | X |

This designation with A for 01:00 has the advantage that the usual counting, starting at 1 is mapped to the familiar letters of the alphabet. Where X: 00 is the time on which the world day starts. The syntax of the clock notation of X: 00 over A: 00 to W: 00 is already recognizable by the syntax of the time notation even for computerized applications. The notation of other time spellings such. 00:00UTC+2 for 0:00 Central European Time, or 00:00 L for 00:00 for Local Time, 00:00 W or 00:00 Z for Time 00:00 in Zulu Time Zone NATO well distinguishable. L: 00 is therefore the time 12:00 in the arbitrarily set UTC time and not about 00:00 L of the local time.

In order to establish a concordance between the world time and the time zones, a time zone list can be present on or in the clock, which is not changeable in relation to the world time.

TABLE 1

List of standard time zones

| Standard time zone | Time deviation against world time | Degree count based on 00:00 or X: 00 World Time in digit sheet with 24 h representation |
|---|---|---|
| Z | 00 h | +000° |
| A | −01 h | +015° |
| B | −02 h | +030° |
| C | −03 h | +045° |
| C * | −03:30 h | +052° 30' |
| D | −04 h | +060° |
| D * | −04:30 h | +067° 30' |
| E | −05 h | +075° |
| E * | −05:30 h | +082° 30' |
| ET | −5:45 pm | +086° 15' |
| F | −06 h | +090° |
| F * | −06:30 h | +097° 30' |

In a particular exemplary arrangement, it is provided that a device for determining geo-coordinates is connected to the movement in or on the world time clock according to the exemplary arrangement, and that the movement causes the hands to move rotationally when changing the geo-coordinates corresponding to the time zone relative to the stationary oriented 24-hour clock face.

Corresponding to the dial clock (analog clock) with dial and at least one indicator or pointer such as hands, is also a digital clock as a world clock, comprising a digital display for a local time, a digital display for a world time, wherein in or at the world clock a device for determining the geo-coordinates with a digital movement of the digital display is connected to present a local time and adjusted when changing the geo-coordinates of the clock to present a local time corresponding to the time zone where the clock is currently located.

The analog clock or the digital clock can also be implemented as a clock including a computer. The display of a computer displays an analogue clock with dial and hands. In the computer there is a device for determining the geographic coordinates, which changes a counter or a variable within the algorithm for displaying the clock so that the 24-hour dial is rotated relative to a clock face as the geographic coordinates change corresponding to the time zone. Radio-controlled clocks or clocks that derive their time from a network time signal, such as with the NTP protocol (Network Time Protocol) or via the GSM network or the ISDN network, thereby recognize the local time using the usual convention for specifying the time, such as UTC-x, where x is a time shift, or XX: XXA, where A is the time zone, does not require a geo-coordinate determination device. In these clocks, the device for determining geo-coordinates may be replaced by the computer executing an algorithm for determining the time zone from the time of the remote-transmitted wireless time signals.

BRIEF DESCRIPTION OF DRAWINGS

The exemplary embodiments will be explained in more detail with reference to the following Figures.

DETAILED DESCRIPTION

Figure 1:
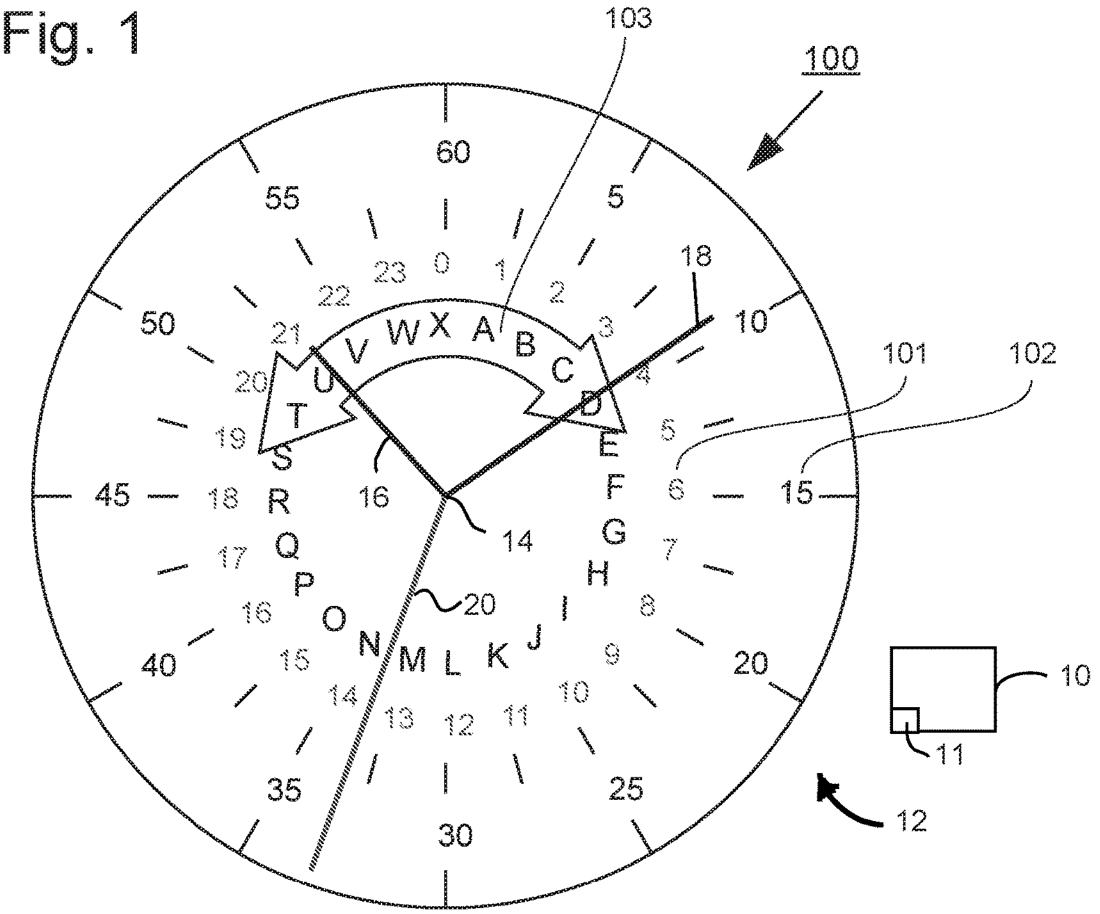
FIG. 1 is a dial of an analog clock according to an exemplary arrangement, or an analog clock simulator by a computer.

FIG. 1 shows a dial 100 of an analog world time clock according to an exemplary arrangement or an analog clock simulated by a computer 10 on a display, generally indicated 12. A movement 11 which may in some arrangements be part of the computer is operative to move the hands of the clock. This dial 100 alternatively referred to herein as a clock face, has a stationary oriented 24-hour dial 101 with 24-hour marks as shown, which serves to display the local hourly time. Furthermore, the dial 100 has another second/minute dial 202 on which both the seconds and the minutes are readable. Although it is in principle possible to divide the 24-hour dial 101 in 60 units and to use only a single dial for the local time display of the analog clock, a regular angular subdivision of the 24-hour dial 101 into 60 parts for 60 minutes or seconds, however, leads to an irregular structure of the graduations, because 60 cannot be separated by 24 into whole parts. For intuitive and easy reading, it is therefore intended to separate the dials with the marks for the 24 hours and for the minutes/seconds.

According to an exemplary arrangement, a world time dial 103 rotatable relative to the stationary orientated 24-hour dial 101 is provided in the dial 100. This world time dial 103 is rotated by the clock about an axis 14 in parallel with the hands (hour hand 16, minute hand 18 and second hand 20), depending on the geographical location of the clock and the time zone present there. For example, if the clock were at 00:00:00 local time in time zone Z (Greenwich, UK), all the hands would be on the top digit and would be at 0 on 24-hour dial 101. The world time dial 103 would be at the top with a rotational position X angularly linearly aligned with 0 on 24-hour dial 101. If the clock were now fictitiously transported to Central Europe (UTC+1 h) without any change in real time, all the hour hand would be on the 1 of the 24-hour dial 101. At the same time, the rotatable world-time dial 103 with the X would also coincide with the 0 of the 24-hour dial 101 because the world time has not changed in the spatial transport. The hour hands are for the local time reading on the 1 for 01:00, but the dials on the clocks remain coincident with the X for X: 00 or 00:00 UTC, or 00:00 Z.

Figure 1A:
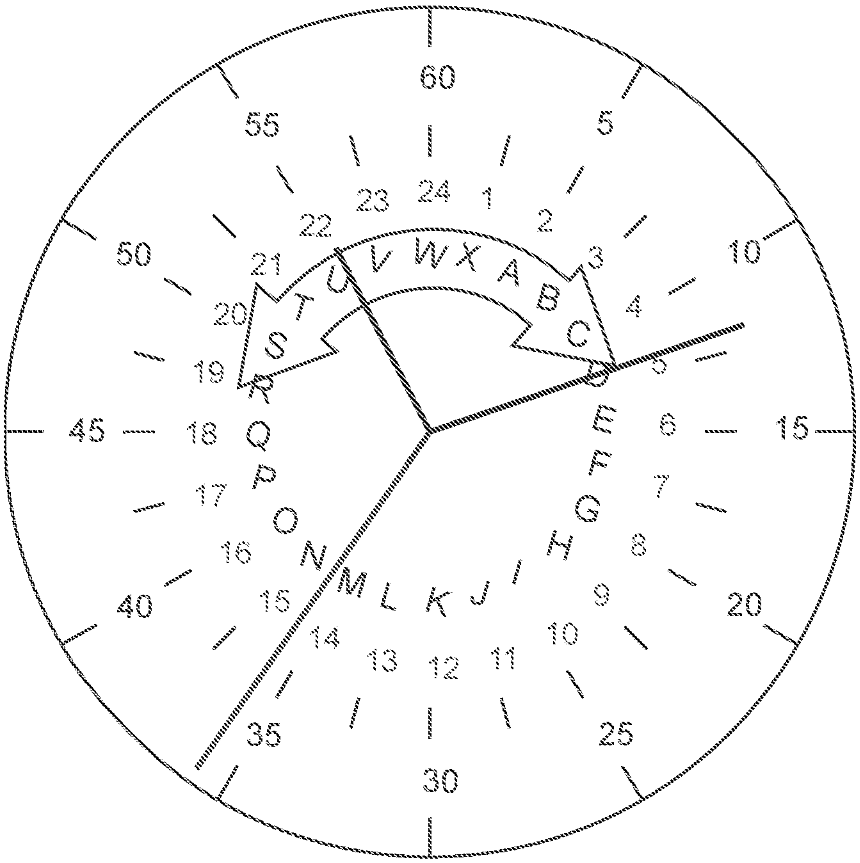
FIG. 1A shows a clock face of an analog clock, or an analog clock simulated by a computer and, rotated by a time zone hour to the east compared to FIG. 1.

Two corresponding partners, one of whom is based in Greenwich, UK (21:09 Z, UTC+0), date the watch as shown in FIG. 1, and the other correspondent partner in Central Europe (22:09 A, UTC+1), for example, these corresponding partners can arrange for a telephone conference at an hour designated by the icon J: 00 the next day. For the corresponding partner in Greenwich, United Kingdom (21: 09 Z, UTC+0), then it will be local time at J: 00, 10:00 Z. Since the partner in Central Europe (22:09 A, UTC+1) sees the World Time dial 103 rotated by 15° clockwise, as shown in FIG. 1A, the corresponding partner in Central Europe becomes J: 00 (11:00 A, UTC+1) 11:00. The world time dial 103 is rotated relative to the adjacent clock face and represents by automatic rotation a list of icons in the form of sequential letters of the Latin alphabet that provide concordance between the hour mark for local time and world time (or other selected designated time in other arrangements), which is also easy and intuitive to read by anyone due to the angular linear alignment as shown.

Figure 2:
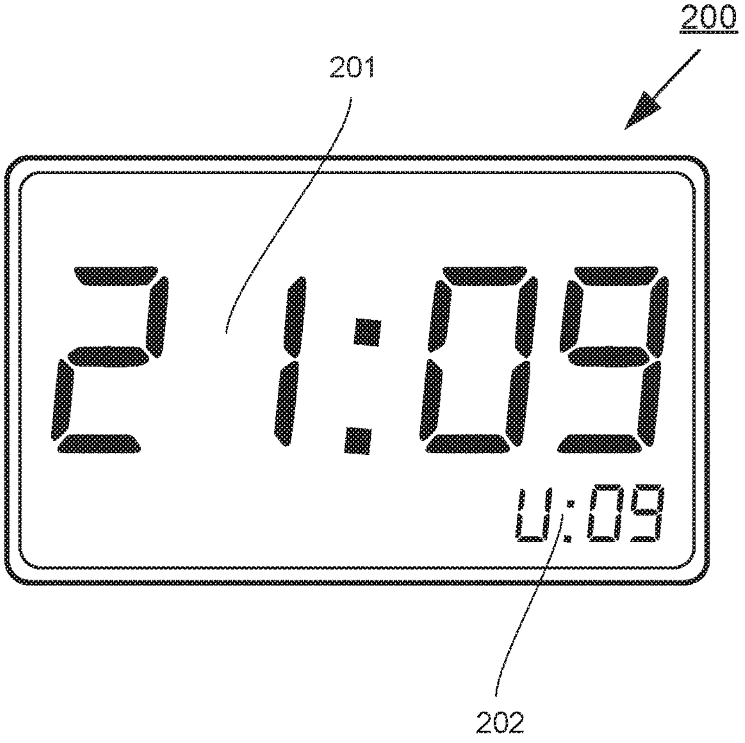
FIG. 2 shows the display of a digital clock, or a digital clock simulated by a computer.

FIG. 2 shows a display of a digital clock according to an exemplary arrangement corresponding to the world clock according to the arrangement, or a digital clock 200 simulated by a computer and according to the arrangement. While the large display 201 always displays the local time (e.g. 21:09 Z) where the clock is currently located, the small display 202 always represents the designated other time zone that is unchangeable with clock location, world time (U: 09).

Figure 3:
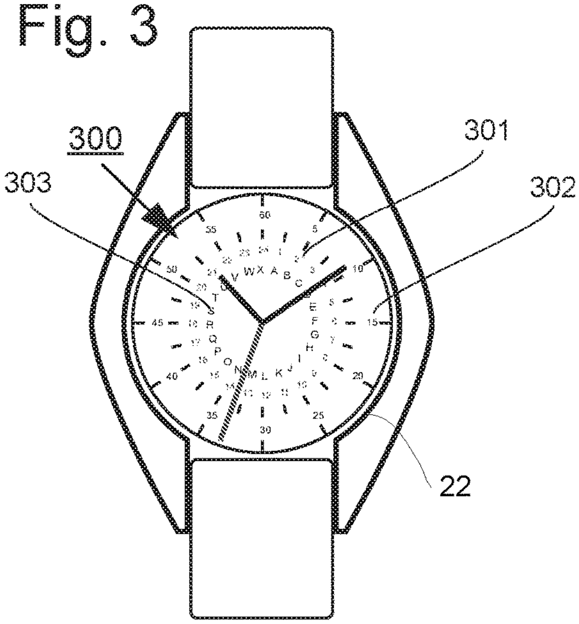
FIG. 3 shows a wristwatch of an exemplary arrangement.

FIG. 3 shows a wristwatch according to an exemplary arrangement which has a body 22 including a dial 300 which is angularly subdivided into a stationary oriented 24-hour dial 301, a second/minute dial 302 and a world time rotatable dial 303 which is rotated responsive to a computer relative to the stationary 24-hour dial 301. The wristwatch may have a GPS receiver as geo-coordinate determining means such as the computer, and internally look up in a table which time zone is associated with the particular geo-coordinate or have a GSM module with which the watch receives both wireless signals indicative of network time and time information about the local time zone. Instead of the device for determining the geo-coordinates, an algorithm for resolving the local time zone may be used by the computer to cause rotation of the world time dial 303 responsive to a determination of the time zone in which the watch is currently located.

Figure 4:
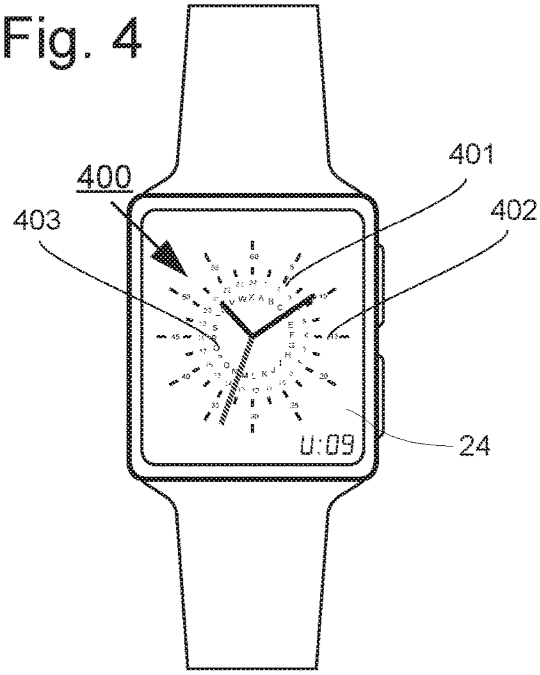
FIG. 4 shows a digital wristwatch, or a digital clock produced on computer display.

FIG. 4 shows a wristwatch based on a computer. This wristwatch is basically a full-size computer as small as a wristwatch and simulates through outputs on a display 24 an analog watch having a clock face with a dial 400 subdivided into a stationary 24-hour dial 401, a second/minute dial 402 and movably opposite the stationary, 24-hour dial 301, a rotatable world time dial 403 that is rotatably positioned responsive to the determination by the computer of the time zone where the watch is currently located. The wristwatch may have a GPS receiver as a geo-coordinate determining device and internally look up in a table which time zone is associated with the particular geo-coordinate or have a GSM module included as part of the computer with which the watch receives both wireless network time and time information signals about the local time zone. Instead of the device for determining the geo-coordinates, the computer may use an algorithm for extracting the local time zone and that causes a rotation of the world time dial 403.

Figure 5:
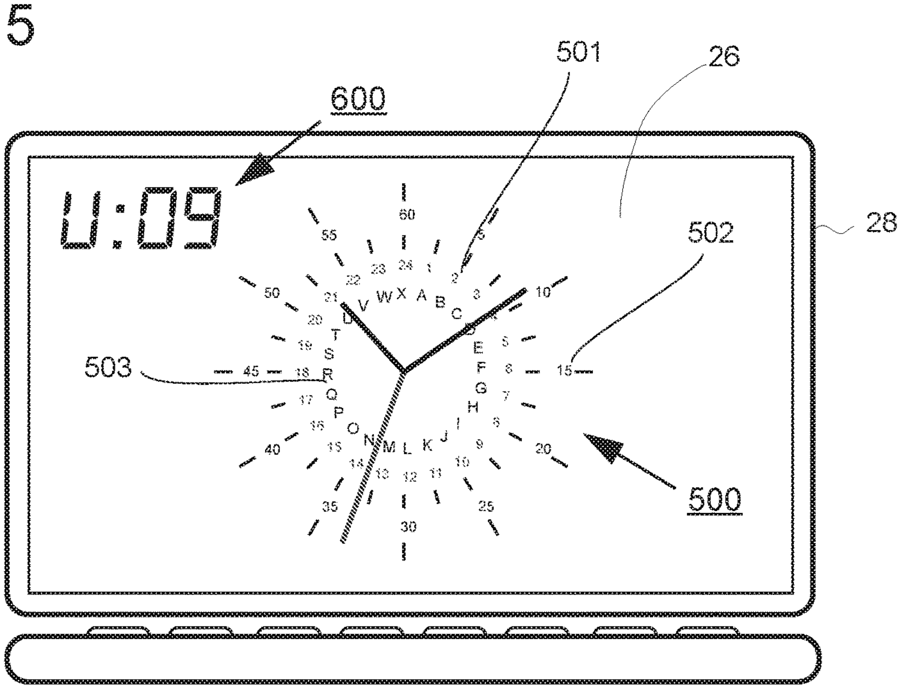
FIG. 5 shows a folding computer which has a display with outputs that simulates a real time clock.

FIG. 5 shows a folding computer (laptop computer) as a computer, which simulates a world time clock according to an exemplary arrangement twice, namely once as an analog clock 500 and once as a digital world clock 600. The same applies to the computer as to the wristwatch based on a computer in FIG. 4. The computer simulates an analog clock 500 on the display 26 having a clock face dial divided into a stationary 24-hour dial 501 with 24-hour marks, a seconds/minute dial 502, and a world time dial 503 that is rotatable relative to the stationary 24-hour dial 501 and a body 28 which is in operative connection with display 26. The computer may include a GPS receiver as a geo-coordinate determining device and internally look up in a table which time zone the particular geo-coordinate is associated with or a GSM module with which the computer receives both network time and information over the local time zone. Finally, location determination by the local network infrastructure is also possible, such as information from a network router connected to the computer.

Instead of the device for determining the geo-coordinates, the computer may use an algorithm for determining the local time zone from the received information such that the computer causes a rotation of the world time dial 503 responsive at least in part to determination of the time zone.

Figure 6:
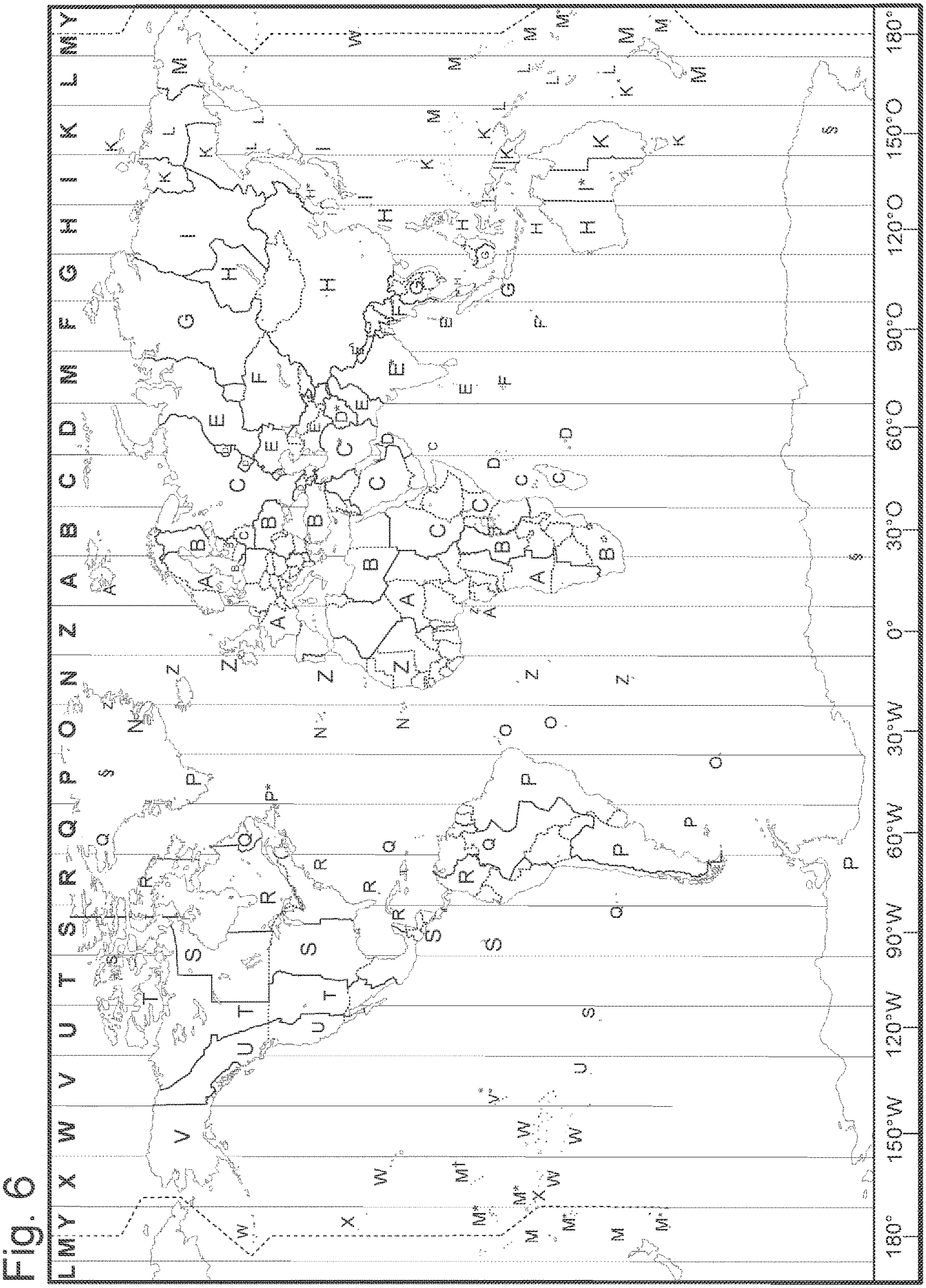
FIG. 6 shows a time zone map for explaining the time zones in contrast to world times on the basis of Latin letters.

FIG. 6 shows a world map in which the 40 standard time zones Z, A, B, C, C*, D, D*, E, E*, E<†>, F, F*, G, H, H*, I, I*, K, K*, L, L*, M, M<††>, M*, M<†>, N, O, P, P*, Q, Q*, R S, T, U, V, V*, W, X, Y are shown. These time zones after standardized naming are invariable compared to the world time, which are divided here into the 24 hours from A to X. The similar nomenclature of the 40 time zones should not be confused with the naming of the 24 hours with the letters from A to X. In the standard time zone Z (Greenwich, UK), the local time 00:00 Z will always be the time X: 00 and in the time zone H (Western Australia) the local time 00:00 H will always be the world time H: 00. The here emerging match is not accidental, but intentional. The time of the daily change should correspond as far as possible to the local time zone, in order to support the intuition of the time measure. The designated standard time zones on the world map do not include a time zone L to avoid confusion with a possible misinterpretation for a local time.

The world time L: 00 corresponds to the time in Central Europe (UTC+1), time zone A, 13:00 A (see FIG. 1A). At L: 00 it is in the time zone UTC+12 (standard time zone Y) 00:00. In the time zone Y, therefore, the intuity is not given, the time zone Y being changed to a time zone X, W and M* due to the proximity of the date change from the areas located there.

Figure 7:
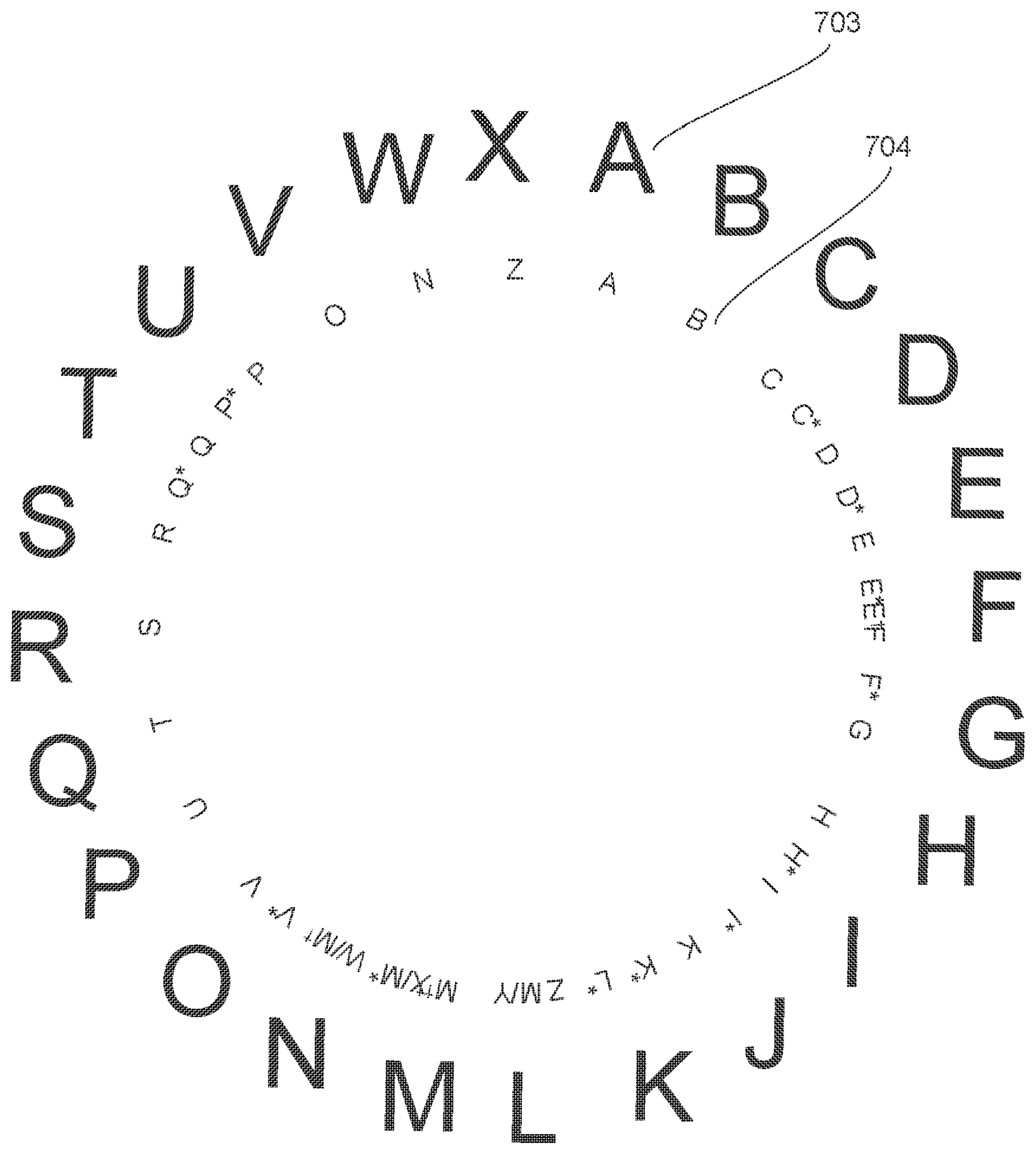
FIG. 7 shows a concordance plot of world time and time zones.

For a very accurate representation in an alternative arrangement, a standard time-zone 704 plot may also be provided on the world time dial 703, which is rotatable with respect to the 24-hour dial, as shown in FIG. 7, such that the clock is also in the NATO range can be used in aviation where times are given in DTG (Date Time Group) or in standard time zones.

The universal world time clock presented here is based on the assumption of a time that is the same for all time zones. This means that a time arbitrarily chosen here as an example L: 00 o'clock in the whole world at the same time is also called L: 00. For a first person in a first location in the world, the time may be L: 00 o'clock in the morning, while the identical L: 00 o'clock for a second person in another place in the world may fall on the evening. For example, it would be possible to name the world time UTC in the 24-hour notation from 00:00UTC+00 (X: 00) through 01:00UTC+00 (A: 00) to 23:00 (W: 00).

Thus the exemplary arrangements achieve improved operation, eliminate difficulties encountered in the use of prior devices and systems and attain the useful results described herein.

In the foregoing description, certain terms have been used for brevity, clarity and understanding. However, no unnecessary limitations are to be implied therefrom because such terms are used for description purposes and are intended to be broadly construed. Moreover the descriptions and illustrations herein are by way of examples and the new and useful concepts are not limited to the exact features shown and described.

It should be understood that the features and/or relationships associated with one example arrangement can be combined with features and/or relationships from another example arrangement. That is, various features and/or relationships from various arrangements can be combined in further arrangements. The inventive scope of the disclosure is not limited to only the exact arrangements shown or described herein.

Having described the features, discoveries and principles of the exemplary arrangements, the manner in which they are constructed and operated, and the advantages and useful results attained, the new and useful features, devices, elements, arrangements, parts, combinations, systems, equipment, operations, methods, processes and relationships are set forth in the appended claims.

The invention claimed is:

1. Apparatus comprising:

a clock enabling time coordination by persons in different time zones including:

a body, a movement, wherein the movement is in operatively supported connection within the body, hour and minute hands, wherein each of the hour and minute hands are rotationally movable about a common axis responsive to the movement, a 24-hour clock face, wherein the clock face is in a fixed operative orientation relative to the body, and wherein the common axis is in centered relation relative to the clock face, wherein the clock face includes fixed 24-hour markings, each hour marking corresponding to a respective hour among the 24 hours, a circular dial, wherein the dial is rotatably movable in operative supported connection with the body, wherein the dial is selectively rotatably movable about the common axis relative to the fixed hour markings on the clock face, wherein the dial includes a plurality of icons, wherein each icon is visibly different from each of the other icons, and is selectively rotatably positionable via dial rotation to be in angular linear alignment with each one of the hour markings, a computer, wherein the computer is in operative connection with the dial, wherein the computer is operative to cause responsive at least in part to at least one wireless network signal, a determination of a current time in a time zone in which the clock is currently located, responsive at least in part to the current time determination, the dial to move and be rotatably positioned with one particular icon angularly linearly aligned with one particular hour marking, wherein the hour hand position is indicative of both an hour marking corresponding to the current time in the time zone in which the clock is currently located and an icon on the dial corresponding to a current hour of a world wide standard time.

2. The apparatus according to claim 1 wherein the computer is operative to determine geo-coordinates corresponding to a current location of the clock, wherein the computer is operative to make the current time determination responsive at least in part to the geo-coordinates.

3. The apparatus according to claim 1 wherein the dial includes 24 icons that are equally angularly spaced, wherein each of the icons corresponds to a respective hour of a 24-hour day.

4. The apparatus according to claim 1 wherein the dial includes 24 icons that are equally angularly spaced, wherein each of the icons corresponds to a respective hour of a 24-hour day, wherein each icon corresponds to a respective letter of a Latin alphabet.

5. The apparatus according to claim 1 wherein the dial includes 24 icons that are equally angularly spaced, wherein each of the icons corresponds to a respective hour of a 24-hour day, wherein each icon corresponds to a respective letter of a Latin alphabet gaplessly from A to X, in alphabetical order sequence.

6. The apparatus according to claim 1 wherein the dial includes 24 icons that are equally angularly spaced, wherein each of the icons corresponds to a respective hour of a 24-hour day beginning with an hour 01:00 of the 24-hour day and extending to an hour 0:00 of an immediately next day, wherein each icon corresponds to a respective letter of a Latin alphabet gaplessly from A to X, in alphabetical order sequence.

7. The apparatus according to claim 1 wherein the dial includes 24 icons that are equally angularly spaced, wherein each of the icons corresponds to a respective hour of a 24-hour day, wherein each icon comprises a letter of a Latin alphabet corresponding to a respective hour of the world wide standard time.

8. The apparatus according to claim 1 wherein the clock face further includes fixed minute markings usable to determine a respective minute of a respective hour, wherein the computer is in operative connection with the movement, wherein the computer is further operative to cause responsive at least in part to the determination of the current time, the movement to position the hour and minute hands relative to the clock face to indicate the hour and minute of the current time in the time zone in which the clock is currently located.

13. The apparatus according to claim 1 and further comprising:

a display, wherein the display is in operative connection with the computer, wherein the computer is operative to cause the display to output a digital time output, wherein the display is operative to output a digital representation of at least one of the current time in the time zone in which the clock is currently located, and a current world wide standard time, and wherein when the current world wide standard time is output, indicating indicia is concurrently output from the display indicative that the output is the current world wide standard time.

14. The apparatus according to claim 1 wherein the at least one network signal comprises at least one of a GSM network signal, an ISDN network signal and an NTP signal.

15. The apparatus according to claim 1 wherein the icons consist of a gapless letter series of A to X in alphabetical order, wherein each respective letter corresponds with a respective hour of Coordinated Universal Time (UTC) in accordance with the table

| 01:00 | 02:00 | 03:00 | 04:00 | 05:00 | 06:00 | 07:00 | 08:00 | 09:00 | 10:00 | 11:00 | 12:00 |
|---|---|---|---|---|---|---|---|---|---|---|---|
| A | B | C | D | E | F | G | H | I | J | K | L |
| 13:00 | 14:00 | 15:00 | 16:00 | 17:00 | 18:00 | 19:00 | 20:00 | 21:00 | 22:00 | 23:00 | 00:00 |
| M | N | 0 | P | Q | R | S | T | U | V | W | X. |

9. The apparatus according to claim 1 wherein the computer is operative to make the determination of the current time responsive at least in part to a GSM wireless network time signal.

10. The apparatus according to claim 1 wherein the computer includes the movement, wherein the body includes a display, wherein the display is in operative connection with the computer, wherein the computer is operative to cause the clock face, the hour and minute hands, and the dial to be output on the display.

11. The apparatus according to claim 1 wherein the dial is rotatably positioned relative to the clock face responsive to a current hour of the day in one designated time zone which corresponds to the world wide standard time, wherein the angular linear alignment of the one particular icon with the one particular hour marking, is indicative that each respective fixed hour marking in the time zone in which the clock is currently located corresponds to each respective aligned icon of the world wide standard time.

12. The apparatus according to claim 1 and further comprising:

a display, wherein the display is in operative connection with the computer, wherein the computer is operative to cause the display to output a digital time output indicative of a current world wide standard time and indicia indicative that the digital time output corresponds to the current world wide standard time.

16. Apparatus comprising:

a clock enabling time coordination by persons in different time zones, including:

a 24-hour clock face, wherein the clock face includes a plurality of hour marks, wherein a position of each hour mark is fixed relative to all other hour marks on the clock face, wherein each respective hour mark corresponds to a respective hour among the 24 hours represented by the clock face, at least one indicator, wherein the at least one indicator is movable relative to all the hour marks on the clock face to indicate a current time in a time zone where the clock is currently located, a dial, wherein the dial is movable relative to all the fixed hour marks on the clock face, wherein the dial includes 24 icons, wherein each icon visibly differs from each of the other icons, wherein each icon is selectively positionable through dial movement relative to the clock face, to be in linear aligned relation with each one of the hour marks on the clock face, a computer, wherein the computer is in operative connection with the dial, wherein the computer is operative to cause responsive at least in part to at least one received wireless network signal, a determination of a current local time in a time zone where the clock is currently located, responsive at least in part to the local time determination, the dial to move relative to all the hour marks and be positioned with one particular icon linearly aligned with one particular hour mark, wherein the at least one indicator is indicative of each of the current local time based on a positional relationship of the at least one indicator relative to the hour marks, and a current world wide standard time based on a positional relationship of the at least one indicator relative to the icons on the dial.

17. The apparatus according to claim 14 and further comprising:

a display, wherein the display is in operative connection with the computer, wherein the computer is operative to cause the clock face, the at least one indicator and the dial to all be simultaneously output on the display.

18. The apparatus according to claim 16 wherein the computer is operative to determine the current local time in the time zone where the clock is currently located responsive at least in part to each of determined geo-coordinates corresponding to a current clock location, and received wireless network time signals.

19. The apparatus according to claim 16 wherein the computer is in operative connection with the at least one indicator, wherein the at least one indicator includes an hour hand and a minute hand, each rotatable about a common axis with the dial, wherein the computer is operative to cause the hour hand and the minute hand to relatively move with regard to the hour marks on the clock face about the common axis to have the hour hand and the minute hand indicate the current time in the time zone where the clock is currently located, and the dial to move relative to the hour marks on the clock face about the common axis to have the hour hand and the minute hand indicate the current world wide standard time.

20. The apparatus according to claim 19 wherein each of the icons on the dial correspond to a respective letter of a Latin alphabet, without repetition of any letter.

21. The apparatus according to claim 16 wherein linear alignment of each of the one particular icon and the one particular hour mark and an hour hand of the at least one indicator is simultaneously indicative of a current hour of the day in the time zone in which the clock is currently located, and in the world wide standard time.

22. The apparatus according to claim 16 wherein the clock face comprises a circular clock face on which the hour marks are equally angularly spaced, wherein the at least one indicator includes hour and minute hands, wherein the hour and minute hands are movable about an axis relative to the clock face to indicate the current time in the time zone where the clock is currently located, a movement, wherein the movement is in operative connection with the hour and minute hands, wherein the movement is in operative connection with the computer, wherein the dial comprises a circular dial, on which different icons are equally angularly spaced, wherein the icons are each selectively angularly linearly alignable with each respective hour mark through dial rotation about the axis relative to the clock face, wherein the apparatus further includes a display, wherein the display is in operative connection with the computer, wherein the computer is operative to cause the display to output a digital time output that corresponds to at least one of the current time in the time zone in which the clock is currently located, and the current world wide standard time, and wherein when the digital time output corresponds to the current world wide standard time, the computer is operative to cause the display to output indicia that is indicative that the output is the world wide standard time.

23. Apparatus comprising:

a clock enabling time coordination by persons in different time zones, including:

a 24-hour clock face, wherein the clock face includes a plurality of hour marks, wherein each respective hour mark corresponds to a respective hour among the 24 hours represented by the clock face, at least one indicator, wherein the at least one indicator is movable relative to the clock face to indicate a current time in a local time zone where the clock is currently located, a dial, wherein the dial is movable relative to the clock face, wherein the dial includes 24 icons, wherein each icon visibly differs from each of the other icons, wherein each icon corresponds to a one hour time period, wherein each icon is selectively positionable through dial movement relative to the clock face, to be in visually associated relation with each one of the hour markings on the clock face, a computer, wherein the computer is in operative connection with the dial, wherein the computer is operative to cause responsive at least in part to at least one received network communication signal, a determination of the current time in the local time zone where the clock is currently located, responsive at least in part to the current time determination, the at least one indicator to move to indicate the determined current time, and the dial to be positioned with each particular icon visually associated with one respective particular hour mark, wherein the visual association of each particular icon with the one respective particular hour mark is indicative that each particular hour mark in the local time zone corresponds to a respective hour of a world wide standard time that is designated by the one particular icon, whereby the at least one indicator which indicates the determined current time in the local time zone also simultaneously indicates a corresponding current world wide standard time.

24. The apparatus according to claim 23 wherein each particular icon is visually associated with the one respective particular hour mark by being linearly aligned with the one particular hour mark.

25. The apparatus according to claim 23 wherein the clock comprises a body, wherein the clock face is in fixed operative connection with the body, wherein the dial is rotationally movably mounted in operative connection with the body about an axis, and is caused to rotationally move responsive to the current time determination, wherein the at least one indicator includes an hour hand and a minute hand, wherein each of the hour hand and the minute hand are movably mounted in operative connection with the body about the axis, wherein each of the hour hand, the minute hand and the dial is independently movable relative to the clock face about the axis.

* * * * *